United States Patent
Hagiwara (10) Patent No.: US 11,391,373 B2
(45) Date of Patent: Jul. 19, 2022

(54) GASKET

(71) Applicant: NOK CORPORATION, Tokyo (JP)

(72) Inventor: Naoki Hagiwara, Makinohara (JP)

(73) Assignee: NOK CORPORATION, Tokyo (JP)

( * ) Notice: Subject to any disclaimer, the term of this patent is extended or adjusted under 35 U.S.C. 154(b) by 64 days.

(21) Appl. No.: 16/761,641

(22) PCT Filed: Sep. 28, 2018

(86) PCT No.: PCT/JP2018/036508
§ 371 (c)(1),
(2) Date: May 5, 2020

(87) PCT Pub. No.: WO2019/093012
PCT Pub. Date: May 16, 2019

(65) Prior Publication Data
US 2021/0172524 A1 Jun. 10, 2021

(30) Foreign Application Priority Data
Nov. 10, 2017 (JP) .............................. JP2017-217723

(51) Int. Cl.
*F16J 15/10* (2006.01)
*F16J 15/3268* (2016.01)

(52) U.S. Cl.
CPC ......... *F16J 15/104* (2013.01); *F16J 15/3268* (2013.01)

(58) Field of Classification Search
CPC .... F16J 15/00; F16J 15/02; F16J 15/46; F16J 15/48; F16J 15/10; F16J 15/104;
(Continued)

(56) References Cited

U.S. PATENT DOCUMENTS 1,803,665 A * 5/1931 Dennis .................... F16L 51/00
277/314
4,181,314 A 1/1980 Cerf et al.
(Continued)

FOREIGN PATENT DOCUMENTS

DE 10235445 A1 2/2003
GB 1129694 A 10/1968
(Continued)

OTHER PUBLICATIONS

Extended European Search Report dated Jul. 7, 2021 (corresponding to EP18877164.6).
(Continued)

*Primary Examiner* — Nathan Cumar
(74) *Attorney, Agent, or Firm* — Harness, Dickey & Pierce, P.L.C.

(57) ABSTRACT

A gasket is provided which gives stable sealing performance even when an insertion member is inclined with respect to an insertion hole. The gasket includes a body portion 121 which is to be fixed in close contact with an inner peripheral surface of an insertion hole 810 while being spaced apart from an insertion member 900, and a flexible portion 122 which is flexurally deformable and provided to extend from the body portion 121 toward an inner peripheral surface side of the body portion 121. The flexible portion 122 is flexurally bent by being pressed by an extended surface portion 920 of the insertion member 900 and comes into close contact with the extended surface portion 920 while being spaced apart from each of a housing 800 and the insertion portion 910.

8 Claims, 6 Drawing Sheets

(58) Field of Classification Search
CPC ... F16J 15/12; F16J 15/121; F16J 15/122; F16J 15/123; F16J 15/3268; F16J 15/3276
USPC .......................................................... 277/345
See application file for complete search history.

(56) References Cited

U.S. PATENT DOCUMENTS

| | | | | |
|---|---|---|---|---|
| 4,648,789 | A * | 3/1987 | Bowman ................. | F01C 19/12 277/638 |
| 8,246,006 | B2 * | 8/2012 | Leimer .................... | F01L 3/08 277/502 |
| 8,820,798 | B2 * | 9/2014 | Campfort ................. | F16J 15/02 285/331 |
| 2007/0278441 | A1 | 12/2007 | Leimer | |

FOREIGN PATENT DOCUMENTS

| | | |
|---|---|---|
| JP | H06-082854 U | 11/1994 |
| JP | H10-001156 A | 1/1998 |
| JP | H11-173423 A | 6/1999 |
| JP | 2015-105585 A | 6/2015 |

OTHER PUBLICATIONS

Chinese Office Action dated Jul. 16, 2021 (corresponding to CN2021071302738150).

* cited by examiner

GASKET

CROSS-REFERENCE TO RELATED APPLICATIONS

This application is a National Stage of International Application No. PCT/JP2018/036508, filed Sep. 28, 2018 (now WO 2019/093012A1), which claims priority to Japanese Application No. 2017-217723, filed Nov. 10, 2017. The entire disclosures of each of the above applications are incorporated herein by reference.

FIELD

The present disclosure relates to a gasket for sealing an annular gap between a housing having an insertion hole and an insertion member inserted in the insertion hole.

BACKGROUND

A gasket for sealing an annular gap between a housing having an insertion hole and an insertion member inserted in the insertion hole is generally configured to be in close contact with a total of three or more surfaces including one or more surfaces on the housing side and one or more surfaces on the insertion member side (see PTL 1 and 2). The gasket thus configured ensures stable sealing performance if the insertion member is at an appropriate position relative to the insertion hole of the housing.

However, such a gasket as mentioned above may have a portion which is not maintained in a close contact state when an insertion member is inclined with respect to an insertion hole due to dimensional tolerance, attaching manner, vibration, or the like because the gasket is constrained by three or more plural surfaces, resulting in unstable sealing performance.

CITATION LIST

Patent Literature

[PTL 1] Japanese Patent Application Publication No. 2015-105585
[PTL 2] Japanese Patent Application Publication No. H11-173423

SUMMARY

Technical Problem

An object of the present disclosure is to provide a gasket which gives stable sealing performance even when an insertion member is inclined with respect to an insertion hole.

Solution to Problem

To achieve the object described above, the present disclosure adopts the following means.

Specifically, a gasket of the present disclosure is a gasket for sealing an annular gap between a housing having an insertion hole and an insertion member having an insertion portion to be inserted in the insertion hole and an extended surface portion extending outward from an outer peripheral surface of the insertion portion, the extended surface portion being located at a position in the insertion portion not to be inserted in the insertion hole, the gasket including: a body portion which is to be fixed in close contact with an inner peripheral surface of the insertion hole while being spaced apart from the insertion member; and a flexible portion which is flexurally deformable and provided to extend from the body portion toward an inner peripheral surface side of the body portion, wherein the flexible portion is configured to be flexurally bent by being pressed by the extended surface portion of the insertion member and come into close contact with the extended surface portion while being spaced apart from each of the housing and the insertion portion.

The gasket according to the present disclosure seals the annular gap between the housing and the insertion member since the body portion is in close contact with the inner peripheral surface of the insertion hole of the housing and the flexible portion comes into close contact with the extended surface portion of the insertion member. Since the flexible portion is in a flexurally deformed form when being in close contact with the extended surface portion while remaining spaced apart from each of the housing and the insertion portion, even when the insertion member is inclined with respect to the insertion hole, the flexible portion itself is deformed, without being constrained by the housing and the insertion portion, in accordance with inclination of the insertion member with respect to the insertion hole, thereby the state where the flexible portion is in close contact with the extended surface portion can be maintained.

The flexible portion may be provided to extend from a position in the body portion, the position being located away from an extended-surface-portion-side end surface of the body portion toward a side opposite to the extended-surface-portion-side, allowing an annular groove to be formed between the body portion and the flexible portion.

This can lengthen the flexible portion without increasing the total length of the gasket. By thus lengthening the flexible portion, it is possible to increase the amount of possible flexural deformation.

The body portion may be formed of a cylindrical portion having a cylindrical surface portion on each of the inner peripheral surface side and an outer peripheral surface side, the flexible portion may include: a radially-shrinking portion extending from the body portion toward the inner peripheral surface side of the body portion, of which an inner peripheral surface side and an outer peripheral surface side both radially shrink toward the extended surface portion; and a cylindrical portion extending from the radially-shrinking portion toward the extended surface portion, and an outside diameter of the cylindrical portion may be smaller than a minimum inside diameter of the inner peripheral surface of the body portion.

This can make the cylindrical portion easier to flexurally bend.

The flexible portion may have a leading end portion which is provided closer to the extended surface portion than the cylindrical portion and configured to determine bending direction of the flexible portion when the leading end portion is pressed by the extended surface portion.

Since the leading end portion determines the bending direction of the flexible portion, it is possible to suppress variation in deforming manner of the flexible portion and in position where the leading end portion comes into close contact with the extended surface portion.

The leading end portion may have a portion expanding radially outward such that a maximum thickness portion in the leading end portion is thicker than the cylindrical portion, and has an inclined surface radially extending toward the extended surface portion at an extended-surface-portion-side end of the leading end portion.

This allows the leading end portion to be deformed such that the end thereof is inclined radially outward when the leading end portion is pressed by the extended surface portion, thereby the flexible portion is deformed such that the cylindrical portion curves radially inward. Note that the maximum thickness portion in the leading end portion may be thicker than the radially-shrinking portion.

The leading end portion may have a portion expanding radially inward such that a maximum thickness portion in the leading end portion is thicker than the cylindrical portion, and has an inclined surface radially shrinking toward the extended surface portion at an extended-surface-portion-side end of the leading end portion.

This allows the leading end portion to be deformed such that the end thereof is inclined radially inward when the leading end portion is pressed by the extended surface portion, thereby the flexible portion is deformed such that the cylindrical portion curves radially outward. Note that the maximum thickness portion in the leading end portion may be thicker than the radially-shrinking portion.

The individual configurations described above can be adopted by being combined with each other as much as possible.

Advantageous Effects of the Disclosure

As described above, the present disclosure achieves stable sealing performance even when the insertion member is inclined with respect to the insertion hole.

DETAILED DESCRIPTION

Referring to the drawings, the following will illustratively describe modes for carrying out this disclosure in detail on the basis of embodiments. It should be noted that, unless particularly specified otherwise, the dimensions, materials, shapes, relative arrangement, or the like of the components described in the embodiments are not intended to limit the scope of this disclosure thereto. A gasket according to each of the embodiments is configured to seal an annular gap between a housing having an insertion hole and an insertion member to be inserted in the insertion hole. Specific examples of the housing include a head cover and an inverter case. Specific examples of the insertion member include an injection pipe and a plug tube.

First Embodiment

Figure 1:
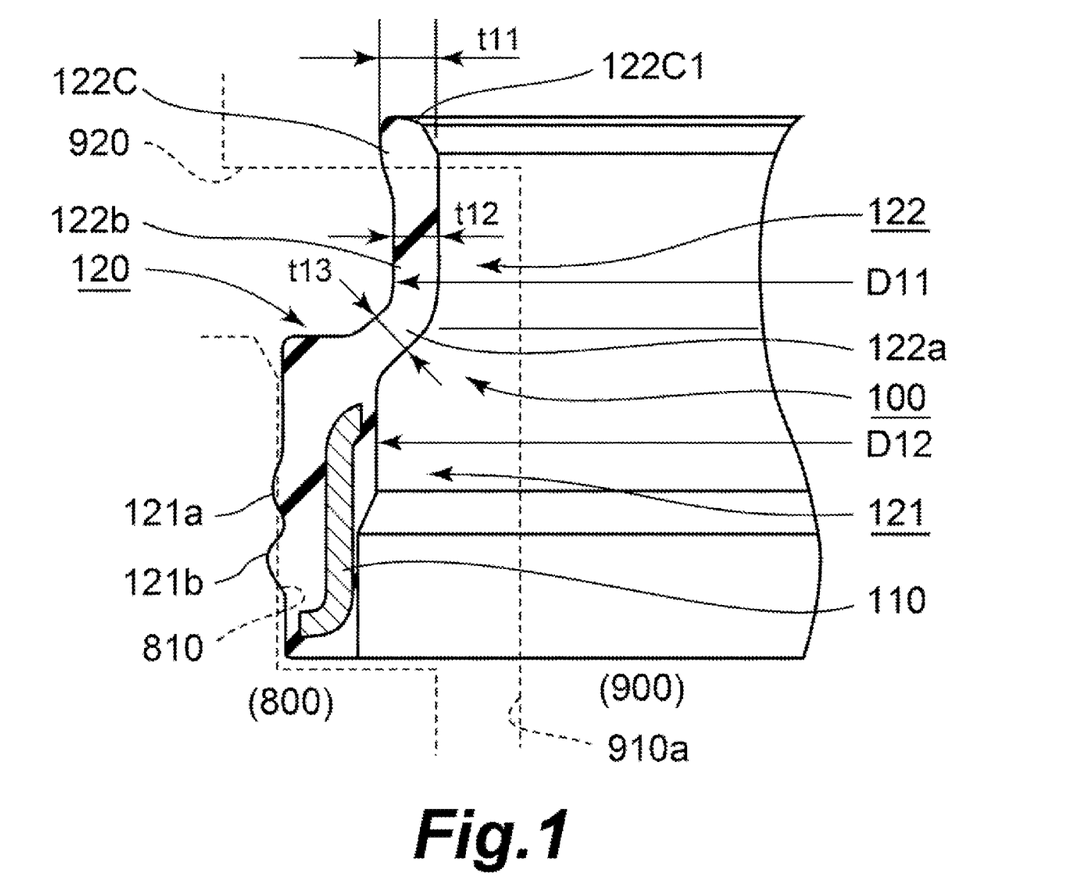
FIG. 1 is a schematic cross-sectional view of a gasket according to a first embodiment.
Figure 2:
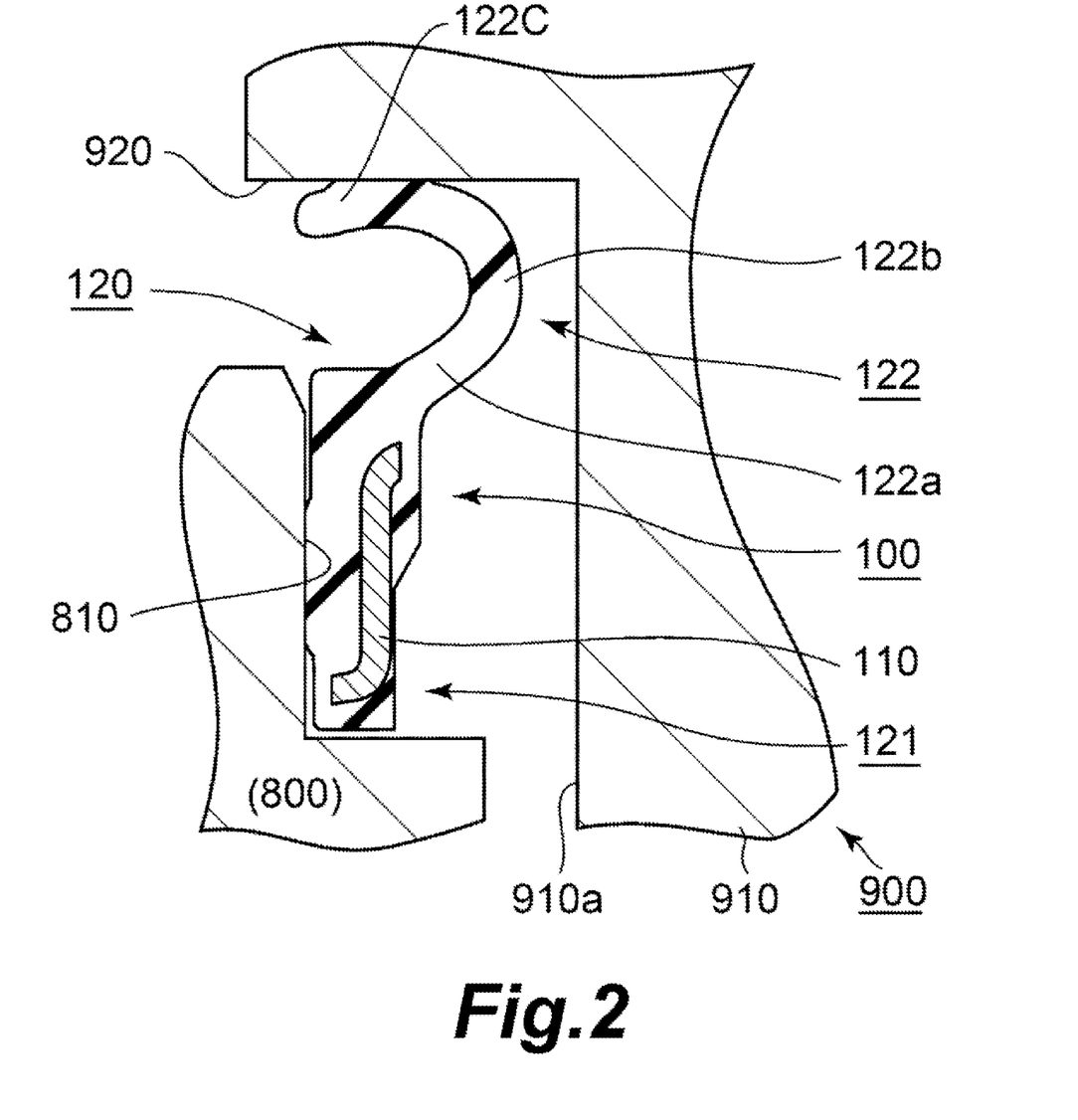
FIG. 2 is a schematic cross-sectional view of a sealing structure according to the first embodiment.

Referring to FIGS. 1 and 2, a description will be given of a sealing device according to the first embodiment. FIG. 1 is a schematic cross-sectional view of a gasket according to the first embodiment. Note that the gasket has a rotationally symmetric shape, and FIG. 1 shows a cross-sectional view along a surface including a center axis of the gasket. Dotted lines in FIG. 1 illustrate an inner peripheral surface of the housing and an outer peripheral surface of the insertion member for clearer understanding of positional and dimensional relationships between the gasket and a housing and an insertion member. FIG. 2 is a schematic cross-sectional view of a sealing structure according to the first embodiment. FIG. 2 shows the cross-sectional view along the surface including the center axis of the gasket.

<Housing and Insertion Member>

A description will be given of a housing 800 and an insertion member 900. The housing 800 has an insertion hole 810. Of an inner peripheral surface of the insertion hole 810, at least a portion configured to come into close contact with a gasket 100 is formed of a cylindrical surface. Although the drawings illustrate stepped portions provided in the inner peripheral surface of the insertion hole 810, such stepped portions are not necessarily required. The insertion member 900 has an insertion portion 910 to be inserted in the insertion hole 810 and an extended surface portion 920 extending outward from an outer peripheral surface of the insertion portion 910, the extend surface portion being located at a position in the insertion portion 910 not to be inserted in the insertion hole 810. Specific examples of the shape of the insertion member 900 include a shape having a cylindrical portion and an outward flange portion provided to the cylindrical portion. In this case, the cylindrical portion corresponds to the insertion portion 910, while an end surface of the outward flange portion on the insertion portion 910 side corresponds to the extended surface portion 920. Note that the shape of the insertion member 900 to which the gasket 100 is applied is not limited to such a shape. Although the drawings illustrate an example in which an outer peripheral surface 910a of the insertion portion 910 is the cylindrical surface, the shape of the outer peripheral surface 910a is not particularly limited. The extended surface portion 920 need not necessarily be the end surface of the outward flange portion. Although the drawings illustrate an example in which the extended surface portion 920 is formed of the plane perpendicular to the center axis of the gasket 100, the extended surface portion 920 to which the gasket 100 is applied need not necessarily be a plane. For example, the extended surface portion 920 may be formed of an inclined surface radially shrinking toward the insertion portion 910 side (e.g., a tapered surface) or an inclined surface radially extending toward the insertion portion 910 side (e.g., a tapered surface).

<Gasket>

A detailed description will be given of the gasket 100. The gasket 100 includes a reinforcement ring 110 and a gasket main body 120 made of a rubber-like elastic substance and provided integrally with the reinforcement ring 110. The gasket 100 is obtained by, for example, molding the gasket main body 120 by insert molding using the reinforcement ring 110 as an insert part. The gasket main body 120 includes a body portion 121 and a flexible portion 122 which is flexurally deformable and provided to extend from the body portion 121 to an inner peripheral surface side of the body portion 121. The body portion 121 is configured to be fixed in close contact with the inner peripheral surface of the insertion hole 810 while being spaced apart from the insertion member 900 as illustrated in FIG. 2. The body portion 121 is formed of a cylindrical portion having a cylindrical surface portion on each of the inner peripheral surface side and an outer peripheral surface side. The outer peripheral surface side of the body portion 121 is provided with annular seal projections 121a and 121b.

The flexible portion 122 is configured to be flexurally bent by being pressed by the extended surface portion 920 of the insertion member 900 and come in close contact with the extended surface portion 920 while being spaced apart from each of the housing 800 and the insertion portion 910. The flexible portion 122 includes a radially-shrinking portion 122a extending from the body portion 121 toward the inner peripheral surface side of the body portion 121 and an inner peripheral surface side thereof and an outer peripheral surface side thereof both radially shrinking toward the extended surface portion 920, and a cylindrical portion 122b extending from the radially-shrinking portion 122a toward the extended surface portion 920. The cylindrical portion 122b is designed such that an outside diameter D11 thereof is smaller than a minimum inside diameter D12 of the inner peripheral surface of the body portion 121. The flexible portion 122 has a leading end portion 122c provided closer to the extended surface portion 920 than the cylindrical portion 122b. The leading end portion 122c is designed so as to determine bending direction of the flexible portion 122 when the leading end portion 122c is pressed by the extended surface portion 920. Specifically, the leading end portion 122c has a portion expanding radially outward such that a maximum thickness portion t11 in the leading end portion 122c has a thickness larger than a thickness t12 of the cylindrical portion 122b. In addition, the maximum thickness portion t11 is configured to have a thickness larger than a thickness t13 of the radially-shrinking portion 122a. Thus, t11>t12≧t13 or t11>t13≧t12 is satisfied. In addition, the leading end portion 122c has an inclined surface 122c1 radially extending toward the extended surface portion 920 at an extended-surface-portion-920-side end of the leading end portion 122c. Although an example has been shown where the inclined surface 122c1 is formed of a tapered surface, an inclined surface may have a curved line in a cross section.

<Sealing Structure>

A description will be given of the sealing structure using the gasket 100. The gasket 100 is fitted into the insertion hole 810 before the insertion member 900 is inserted into the insertion hole 810 of the housing 800. This allows the outer peripheral surface of the body portion 121 of the gasket 100 to come into close contact with the inner peripheral surface of the insertion hole 810. When the insertion member 900 is inserted into the insertion hole 810, the extended surface portion 920 of the insertion member 900 presses the leading end portion 122c of the flexible portion 122 of the gasket 100. Since the leading end portion 122c has the portion expanding radially outward, and the extended-surface-portion-920-side end of the leading end portion 122c is provided with the inclined surface 122c1 radially extending toward the extended surface portion 920, the leading end portion 122c is deformed such that the end thereof is inclined radially outward when the leading end portion 122c is pressed by the extended surface portion 920, thereby the flexible portion 122 is deformed such that the cylindrical portion 122b curves radially inward as illustrated in FIG. 2. The flexurally bent flexible portion 122 comes into close contact with the extended surface portion 920 while being spaced apart from each of the housing 800 and the insertion portion 910.

<Advantages of Gasket According to Present Embodiment>

The gasket 100 seals the annular gap between the housing 800 and the insertion member 900 since the body portion 121 comes into close contact with the inner peripheral surface of the insertion hole 810 of the housing 800 and the flexible portion 122 comes into close contact with the extended surface portion 920 of the insertion member 900. Since the flexible portion 122 comes into close contact with the extended surface portion 920 in a state being flexurally bent while remaining spaced apart from each of the housing 800 and the insertion portion 910, even when the insertion member 900 is inclined with respect to the insertion hole 810, the flexible portion 122 itself is deformed, without being constrained by the housing 800 and the insertion portion 910, in accordance with inclination of the insertion member 900 with respect to the insertion hole 810, thereby the state where the flexible portion 122 is in close contact with the extended surface portion 920 can be maintained. Thus, stable sealing performance can be achieved even when the insertion member 900 is inclined with respect to the insertion hole 810.

Since the cylindrical portion 122b is designed such that the outside diameter D11 thereof is smaller than the minimum inside diameter D12 of the inner peripheral surface of the body portion 121, it is possible to make the cylindrical portion 122b easier to flexurally bend. Thus, position where the leading end portion 122c comes into close contact with the extended surface portion 920 is prevented from being significantly shifted in the process of flexural bending of the flexible portion 122. This suppresses variation in the position where the leading end portion 122c comes into close contact with the extended surface portion 920 and prevents the leading end portion 122c from being significantly moved radially outward.

Since the leading end portion 122c of the gasket 100 determines the bending direction of the flexible portion 122, it is possible to suppress variation in deforming manner of the flexible portion 122 and in position where the leading end portion 122c comes into close contact with the extended surface portion 920. In addition, since the maximum thickness portion t11 of the leading end portion 122c has the thickness larger than the thickness t12 of the cylindrical portion 122b and is more rigid than the cylindrical portion 122b, it is possible to more reliably prevent the leading end portion 122c from being significantly moved radially outward. Further, since the maximum thickness portion t11 of the leading end portion 122c has the thickness larger than the thickness t13 of the radially-shrinking portion 122a and is more rigid than the radially-shrinking portion 122a, it is possible to more reliably prevent the leading end portion 122c from being significantly moved radially outward.

Second Embodiment

Figure 3:
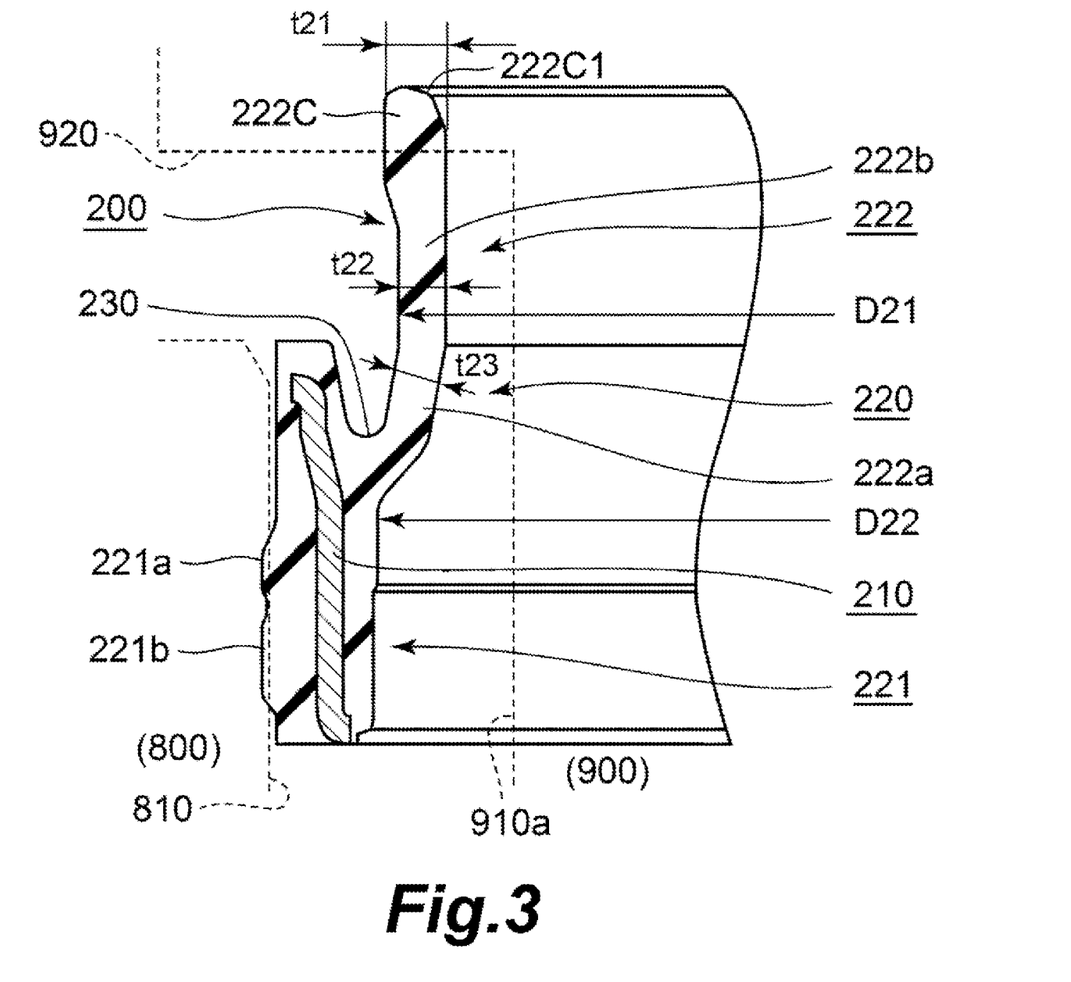
FIG. 3 is a schematic cross-sectional view of a gasket according to a second embodiment.
Figure 4:
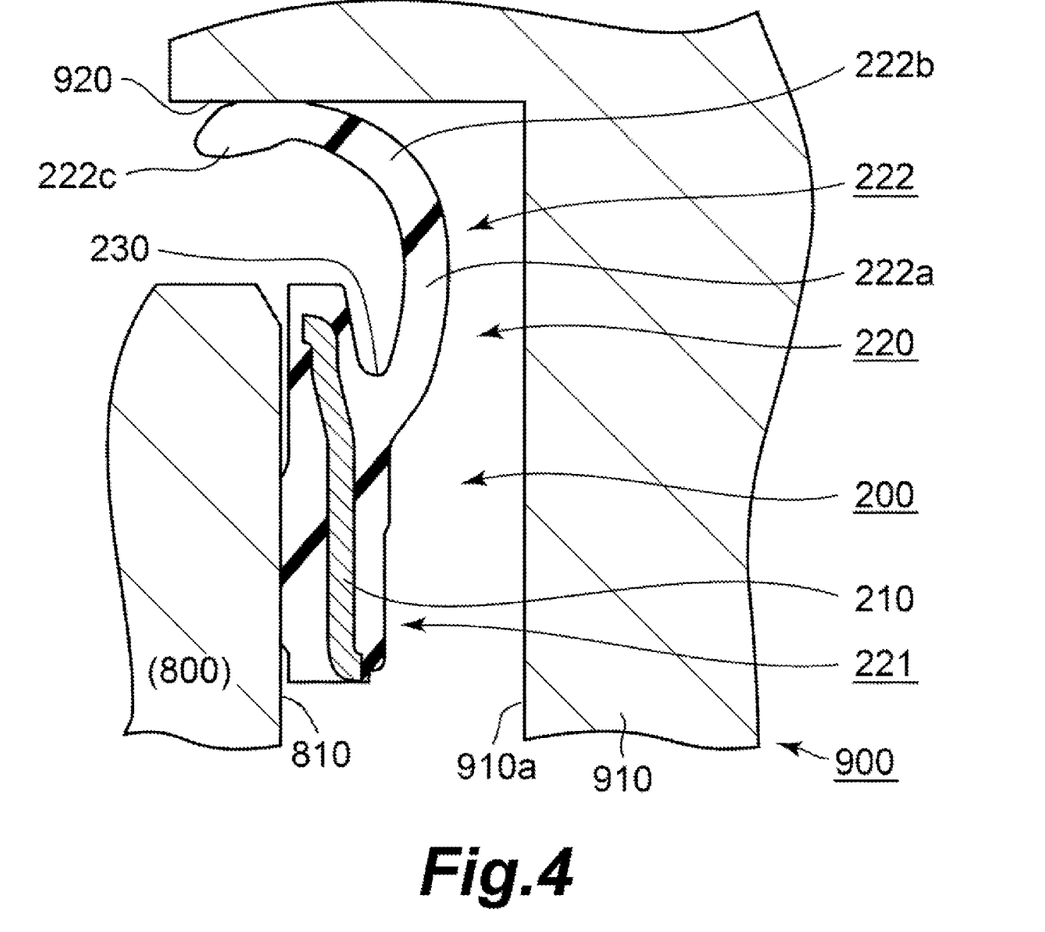
FIG. 4 is a schematic cross-sectional view of a sealing structure according to the second embodiment.

Referring to FIGS. 3 and 4, a description will be given of a sealing device according to the second embodiment. FIG. 3 is a schematic cross-sectional view of a gasket according to the second embodiment. Note that the gasket has a rotationally symmetric shape, and FIG. 3 shows a cross-sectional view along a surface including a center axis of the gasket. Dotted lines in FIG. 3 illustrate an inner peripheral surface of the housing and an outer peripheral surface of the insertion member for clearer understanding of the positional and dimensional relationships between the gasket and the housing and the insertion member. FIG. 4 is a schematic cross-sectional view of a sealing structure according to the second embodiment. FIG. 4 shows the cross-sectional view along the surface including the center axis of the gasket.

Since the housing 800 and the insertion member 900 are as described above in the first embodiment, a description thereof is omitted.

A description will be given of a gasket 200 according to the present embodiment. The gasket 200 includes a reinforcement ring 210 and a gasket main body 220 made of a rubber-like elastic substance and provided integrally with the reinforcement ring 210. The gasket 200 is obtained by, for example, molding the gasket main body 220 by insert molding using the reinforcement ring 210 as an insert part. The gasket main body 220 includes a body portion 221 and a flexible portion 222 which is flexurally deformable and provided to extend from the body portion 221 to an inner peripheral surface side of the body portion 221. The body portion 221 is configured to be fixed in close contact with the inner peripheral surface of the insertion hole 810 while being spaced apart from the insertion member 900 as illustrated in FIG. 4. The body portion 221 is formed of a cylindrical portion having a cylindrical surface portion on each of the inner peripheral surface side and an outer peripheral surface side. The outer peripheral surface side of the body portion 221 is provided with annular seal projections 221a and 221b.

The flexible portion 222 is configured to be flexurally bent by being pressed by the extended surface portion 920 of the insertion member 900 and come in close contact with the extended surface portion 920 while being spaced apart from each of the housing 800 and the insertion portion 910. The flexible portion 222 includes a radially-shrinking portion 222a extending from the body portion 221 toward the inner peripheral surface side of the body portion 221 and an inner peripheral surface side thereof and an outer peripheral surface side thereof both radially shrinking toward the extended surface portion 920, and a cylindrical portion 222b extending from the radially-shrinking portion 222a toward the extended surface portion 920. The cylindrical portion 222b is designed such that an outside diameter D21 thereof is smaller than a minimum inside diameter D22 of the inner peripheral surface of the body portion 221. The flexible portion 222 has a leading end portion 222c provided closer to the extended surface portion 920 than the cylindrical portion 222b. The leading end portion 222c is designed so as to determine bending direction of the flexible portion 222 when the leading end portion 222c is pressed by the extended surface portion 920. Specifically, the leading end portion 222c has a portion expanding radially outward such that a maximum thickness portion t21 of the leading end portion 222c is configured to have a thickness larger than a thickness t22 of the cylindrical portion 222b. In addition, the maximum thickness portion t21 is configured to have a thickness larger than a thickness t23 of the radially-shrinking portion 222a. Thus, t21>t22≥t23 or t21>t23≥t22 is satisfied. In addition, the leading end portion 222c has an inclined surface 222c1 radially extending toward the extended surface portion 920 at an extended-surface-portion-920-side end of the leading end portion 222c. Although an example has been shown where the inclined surface 222c1 is formed of a tapered surface, an inclined surface may have a curved line in a cross section.

The flexible portion 222 of the gasket 200 is provided to extend from a position in the body portion 221, the position being located away from the extended-surface-portion-920-side end surface of the body portion 221 toward a side opposite to the extended-surface-portion-920-side. Thus, an annular groove 230 is formed between the body portion 221 and the flexible portion 222.

Since the sealing structure using the gasket 200 is as described above in the first embodiment, a description thereof is omitted.

The gasket 200 thus configured achieves the same effects as achieved by the first embodiment described above. Since the flexible portion 222 is provided to extend from the position in the body portion, the position being located away from the extended-surface-portion-920-side end surface of the body portion 221 toward the side opposite to the extended-surface-portion-920-side, the flexible portion 222 can be lengthened without increasing the total length of the gasket 200. By thus lengthening the flexible portion 222, it is possible to increase an amount of possible flexural deformation. It is also possible to make the leading end portion 222c less prone to move radially outward compared to that of the first embodiment.

Third Embodiment

Figure 5:
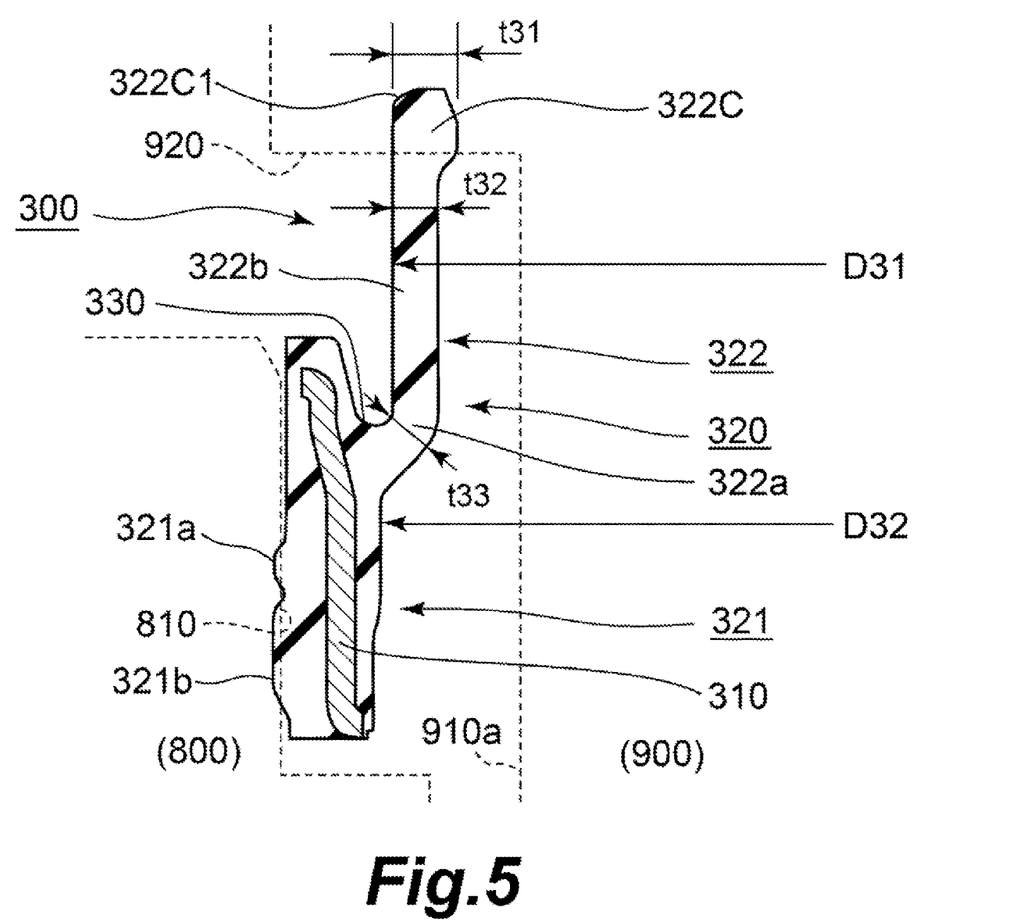
FIG. 5 is a schematic cross-sectional view of a gasket according to a third embodiment.
Figure 6:
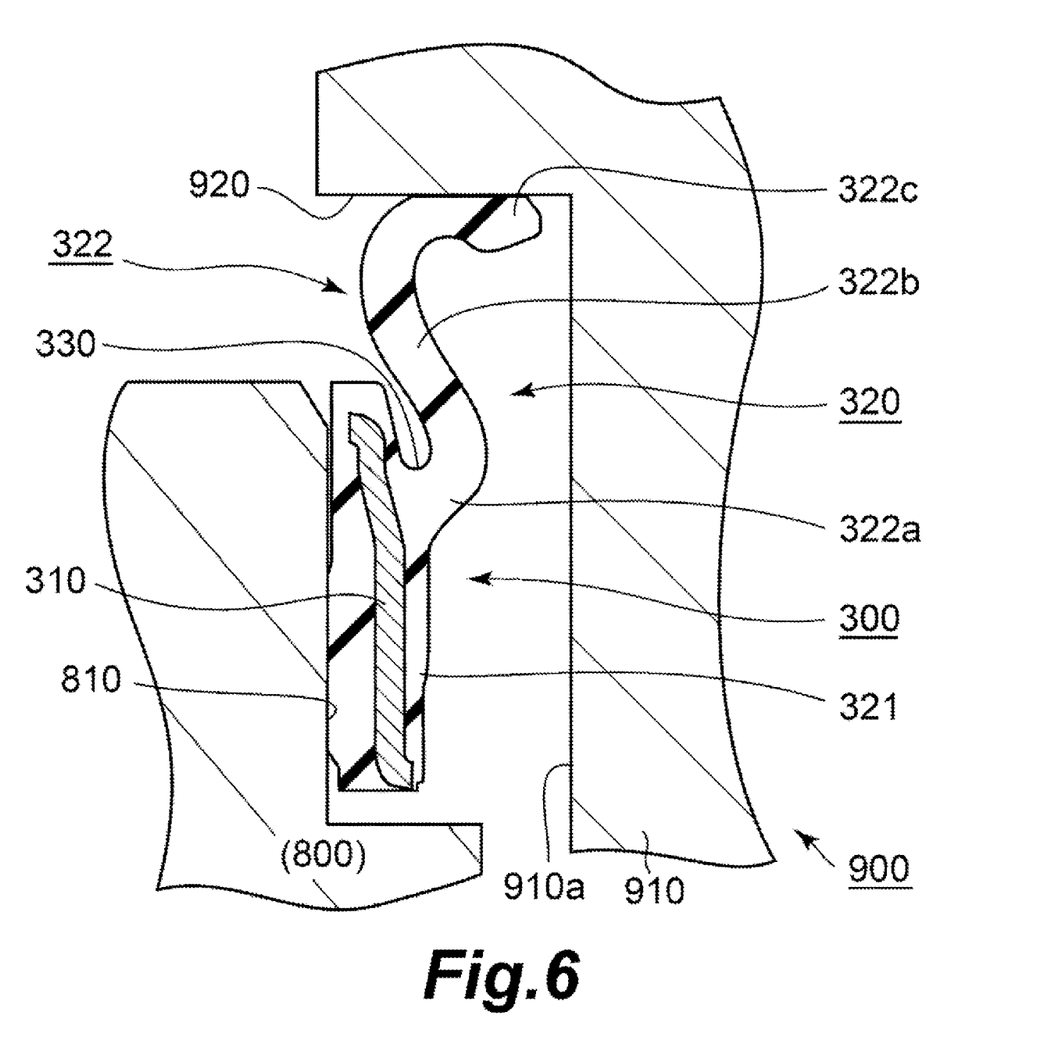
FIG. 6 is a schematic cross-sectional view of a sealing structure according to the third embodiment.

Referring to FIGS. 5 and 6, a description will be given of a sealing device according to the third embodiment. FIG. 5 is a schematic cross-sectional view of a gasket according to the third embodiment. Note that the gasket has a rotationally symmetric shape, and FIG. 5 shows a cross-sectional view along a surface including a center axis of the gasket. Dotted lines in FIG. 5 illustrate an inner peripheral surface of the housing and an outer peripheral surface of the insertion member, for clearer understanding of the positional and dimensional relationships between the gasket and the housing and the insertion member. FIG. 6 is a schematic cross-sectional view of a sealing structure according to the third embodiment. FIG. 6 shows the cross-sectional view along the surface including the center axis of the gasket.

Since the housing 800 and the insertion member 900 are as described above in the first embodiment, a description thereof is omitted.

<Gasket>

A description will be given of a gasket 300 according to the present embodiment. The gasket 300 includes a reinforcement ring 310 and a gasket main body 320 made of a rubber-like elastic substance and provided integrally with the reinforcement ring 310. The gasket 300 is obtained by, for example, molding the gasket main body 320 by insert molding using the reinforcement ring 310 as an insert part. The gasket main body 320 includes a body portion 321 and a flexible portion 322 which is flexurally deformable and provided to extend from the body portion 321 to an inner peripheral surface side of the body portion 321. The body portion 321 is configured to be fixed in close contact with the inner peripheral surface of the insertion hole 810 while being spaced apart from the insertion member 900 as illustrated in FIG. 6. The body portion 321 is formed of a cylindrical portion having a cylindrical surface portion on each of the inner peripheral surface side and an outer peripheral surface side. The outer peripheral surface side of the body portion 321 is provided with annular seal projections 321a and 321b.

The flexible portion 322 is configured to be flexurally bent by being pressed by the extended surface portion 920 of the insertion member 900 and come in close contact with the extended surface portion 920 while being spaced apart from each of the housing 800 and the insertion portion 910. The flexible portion 322 includes a radially-shrinking portion 322a extending from the body portion 321 to the inner peripheral surface side of the body portion 321 and an inner peripheral surface side thereof and an outer peripheral surface side thereof both radially shrinking toward the extended surface portion 920, and a cylindrical portion 322b extending from the radially-shrinking portion 322a toward the extended surface portion 920. The cylindrical portion 322b is designed such that an outside diameter D31 thereof is smaller than a minimum inside diameter D32 of the inner peripheral surface of the body portion 321. The flexible portion 322 have a leading end portion 322c which is provided closer to the extended surface portion 920 than the cylindrical portion 322b. The leading end portion 322c is configured to determine bending direction of the flexible portion 322 when the leading end portion 322c is pressed by the extended surface portion 920. Specifically, the leading end portion 322c has a portion expanding radially outward such that a maximum thickness portion t31 in the leading end portion 322c has a thickness larger than a thickness t32 of the cylindrical portion 322b. In addition, the maximum thickness portion t31 has a thickness larger than a thickness t33 of the radially-shrinking portion 322a. Thus, t31>t32≥t33 or t31>t33≥t32 is satisfied. The leading end portion 322c has an inclined surface 322c1 radially shrinking toward the extended surface portion 920 at the extended-surface-portion-920-side end thereof. Although an example has been shown where the inclined surface 322c1 is formed of a tapered surface, an inclined surface may have a curved line in a cross section.

The flexible portion 322 of the gasket 300 is provided to extend from a position in the body portion 321, the position being located away from the extended-surface-portion-920-side end surface of the body portion 321 toward a side opposite to the extended-surface-portion-920-side. Thus, an annular groove 330 is formed between the body portion 321 and the flexible portion 322.

<Sealing Structure>

A description will be given of the sealing structure using the gasket 300. The gasket 300 is fitted into the insertion hole 810 before the insertion member 900 is inserted into the insertion hole 810 of the housing 800. This allows the outer peripheral surface of the body portion 321 of the gasket 300 to come into close contact with the inner peripheral surface of the insertion hole 810. When the insertion member 900 is inserted into the insertion hole 810, the extended surface portion 920 of the insertion member 900 presses the leading end portion 322c of the flexible portion 322 of the gasket 300. Since the leading end portion 322c has the portion expanding radially inward, and the extended-surface-portion-920-side end of the leading end portion 322c is provided with the inclined surface 322c1 radially shrinking toward the extended surface portion 920, the leading end portion 322c is deformed such that the end thereof is inclined radially inward when the leading end portion 322c is pressed by the extended surface portion 920, thereby the flexible portion 322 is deformed such that the cylindrical portion 322b curves radially outward as illustrated in FIG. 6. The flexurally bent flexible portion 322 comes into close contact relationship with the extended surface portion 920 while being spaced apart from each of the housing 800 and the insertion portion 910.

The gasket 300 thus configured achieves the same effects as achieved by the first embodiment described above. Further, it is possible to lengthen the flexible portion 322 without increasing the total length of the gasket 300 in the same manner as the second embodiment described above. By thus lengthening the flexible portion 322, it is possible to increase an amount of possible flexural deformation. Additionally, in the present embodiment, unlike in the first and second embodiments described above, the flexible portion 322 is deformed such that the cylindrical portion 322b curves radially outward, and the leading end portion 322c faces radially inward. Consequently, even when the extended surface portion 920 has a small radial dimension, the leading end portion 322c is prevented from coming outside of the extended surface portion 920.

Although an example has been shown in which the annular groove 330 is formed in the same manner as the second embodiment described above, it may also be possible to adopt a configuration similar to the first embodiment in which such an annular grove portion is not formed.

REFERENCE SIGNS LIST 100, 200, 300 Gasket
110, 210, 310 Reinforcement ring
120, 220, 320 Gasket main body
121, 221, 321 Body portion
121a, 121b, 221a, 221b, 321a, 321b Seal projection
122, 222, 322 Flexible portion
122a, 222a, 322a Radially-shrinking portion
122b, 222b, 322b Cylindrical portion
122c, 222c, 322c Leading end portion
122c1, 222c1, 322c1 Inclined surface
230, 330 Annular groove
800 Housing
810 Insertion hole
900 Insertion member
910 Insertion portion
910a Outer peripheral surface
920 Extended surface portion

The invention claimed is:

1. A gasket for sealing an annular gap between a housing having an insertion hole and an insertion member having an insertion portion to be inserted in the insertion hole and an extended surface portion extending outward from an outer peripheral surface of the insertion portion, the extended surface portion being located at a position in the insertion portion not to be inserted in the insertion hole, the gasket comprising:
   a body portion which is to be fixed in close contact with an inner peripheral surface of the insertion hole while being spaced apart from the insertion member; and
   a flexible portion which is flexurally deformable and provided to extend radially inward from the body portion, wherein
   the flexible portion is configured to be flexurally bent by being pressed by the extended surface portion of the insertion member and comes into close contact with the extended surface portion while being spaced apart from each of the housing and the insertion portion.

2. The gasket according to claim 1, wherein the flexible portion is provided to extend from a position in the body portion, the position being located away from an extended-surface-portion-side end surface of the body portion toward a side opposite to the extended-surface-portion-side, allowing an annular groove to be formed between the body portion and the flexible portion.

3. The gasket according to claim 1, wherein
   the body portion is formed of a cylindrical portion having a cylindrical surface portion on each of the inner peripheral surface side and an outer peripheral surface side,
   the flexible portion includes:
      a radially-shrinking portion extending from the body portion toward the inner peripheral surface side of the body portion, of which an inner peripheral surface side and an outer peripheral surface side both radially shrink toward the extended surface portion; and a cylindrical portion extending from the radially-shrinking portion toward the extended surface portion, and an outside diameter of the cylindrical portion of the flexible portion is smaller than a minimum inside diameter of the inner peripheral surface of the body portion.

4. The gasket according to claim 3, wherein the flexible portion has a leading end portion which is provided closer to the extended surface portion than the cylindrical portion of the flexible portion and configured to determine bending direction of the flexible portion when the leading end portion is pressed by the extended surface portion.

5. The gasket according to claim 4, wherein the leading end portion has a portion expanding radially outward such that a maximum thickness portion in the leading end portion having a first thickness is thicker than the cylindrical portion of the flexible portion having a second thickness that is less than the first thickness, and has an inclined surface radially extending toward the extended surface portion at an extended-surface-portion-side end of the leading end portion.

6. The gasket according to claim 5, wherein the maximum thickness portion in the leading end portion having the first thickness is thicker than the radially-shrinking portion having a third thickness that is less than the first thickness.

7. The gasket according to claim 4, wherein the leading end portion has a portion expanding radially inward such that a maximum thickness portion in the leading end portion having a first thickness is thicker than the cylindrical portion of the flexible portion having a second thickness that is less than the first thickness, and has an inclined surface radially shrinking toward the extended surface portion at an extended-surface-portion-side end of the leading end portion.

8. The gasket according to claim 7, wherein the maximum thickness portion in the leading end portion having the first thickness is thicker than the radially-shrinking portion having a third thickness that is less than the first thickness.

* * * * *